United States Patent [19]

Babbitt, Jr. et al.

[11] 3,748,923
[45] July 31, 1973

[54] ENVIRONMENTAL SEAL FOR A TRANSMISSION SHIFT LEVER

[75] Inventors: John H. Babbitt, Jr., Peoria; William A. Young, Jr., East Peoria, both of Ill.

[73] Assignee: Caterpillar Tractor Co., Peoria, Ill.

[22] Filed: Aug. 11, 1971

[21] Appl. No.: 170,781

[52] U.S. Cl.................... 74/566, 277/173, 277/100
[51] Int. Cl........................... F16j 9/00, E21b 33/00
[58] Field of Search................... 277/173, 174, 175, 277/100; 74/566

[56] References Cited
UNITED STATES PATENTS
1,037,631 9/1912 Jones.................................. 74/566

FOREIGN PATENTS OR APPLICATIONS
6,622 2/1922 Netherlands....................... 277/100

Primary Examiner—Samuel B. Rothberg
Attorney—Charles M. Fryer, Freling E. Baker et al.

[57] ABSTRACT

A seal assembly for sealing an opening about a control element which passes through a wall. The seal comprises a plurality of plates slidably stacked in an overlapping manner about the control element to cover the opening around the lever and to permit movement of the control element throughout its control range.

7 Claims, 4 Drawing Figures

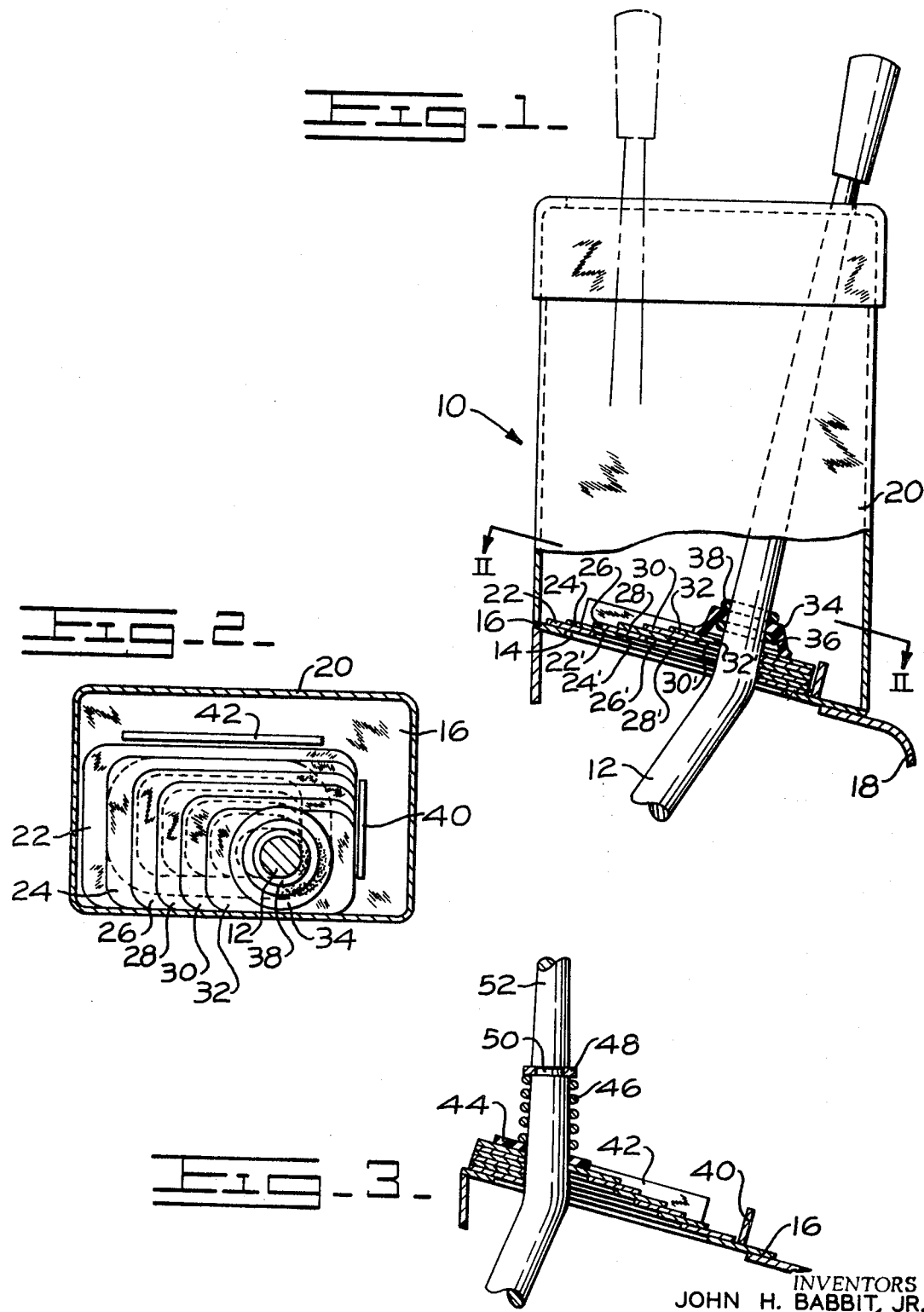

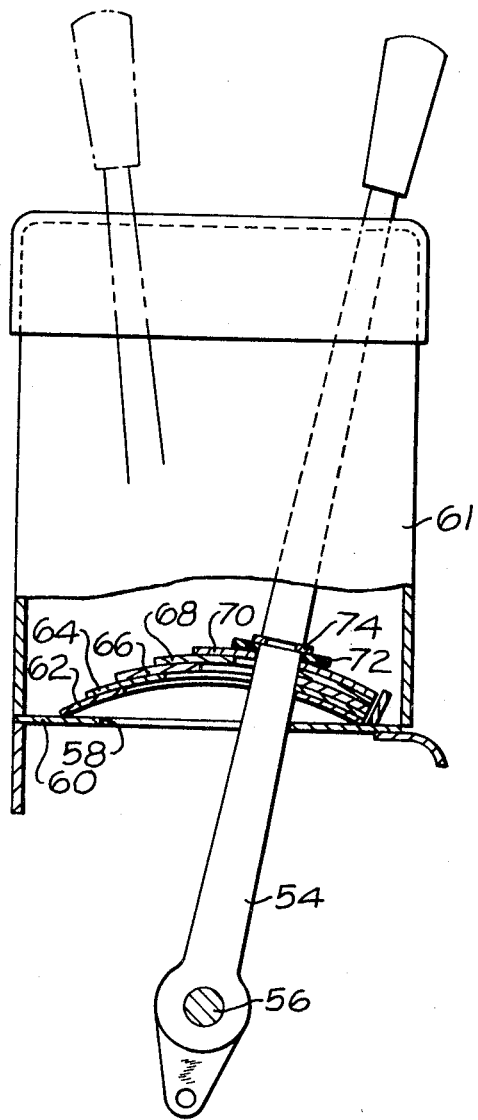

ENVIRONMENTAL SEAL FOR A TRANSMISSION SHIFT LEVER

BACKGROUND OF THE INVENTION

The present invention relates to seals and pertains more particularly to a seal for use with a control lever.

Heavy equipment operators are increasingly providing environmental protective operator cabs for heavy duty off-the-road vehicles. Such provision presents the problem of sealing the operator compartment against outside environmental conditions including dust and noise. The sealing problem is particularly acute in regard to control linkages and levers that extend through the walls of the cab structure and are movable with respect thereto.

The prior art discloses such structures as accordion-like rubber boots and wiping shields made of such materials as felt, and/or rubber. Such prior art seals are satisfactory in some respects but have a number of drawbacks. Among the drawbacks of such prior art seals are short service life due to accidental damage, wear and deterioration resulting from severe climatic conditions and changes.

Boot seals, no matter how light, tend to exert a force on the control lever toward the neutral position. This creates a problem of control, especially where control forces or pressures are light.

It is, therefore, the primary object of the present invention to provide an improved seal assembly that overcomes the above problems of the prior art.

Another object of the prior art is to provide a heavy duty seal assembly that is extremely durable and long lasting.

A further object of the present invention is to provide a seal that is effective in conjunction with a pivotal control lever to seal an opening in a wall around said lever without exerting a bias on said lever.

In accordance with the present invention, the opening around a control lever is sealed by means of a plurality of flat overlapping plates slidably mounted to cover the opening about the lever in all positions of the lever.

BRIEF DESCRIPTION OF THE DRAWINGS

The above and other objects and advantages of the present invention will become apparent from the following specification when read in conjunction with the following drawings in which:

FIG. 1 is an elevational view of a preferred embodiment of the present invention;

FIG. 2 is a view taken along line II—II of FIG. 1;

FIG. 3 is a modification of the embodiment of FIG. 1.

FIG. 4 is an elevational view of an alternate embodiment of the present invention.

DETAILED DESCRIPTION OF PREFERRED EMBODIMENTS

Referring now to the drawings and particularly to FIG. 1, there is illustrated a control lever and seal assembly generally designated by the numeral 10, which assembly comprises a control lever 12 extending through an opening 14 in a wall or housing 16 which may form, as illustrated in the present illustration, a wall of housing 18. The wall 16 and 18 may serve to separate one environment from another, such as, for example, an operator compartment from an engine or transmission compartment of a vehicle. The lever 12 may be surrounded by a console 20 and may comprise a transmission control lever and shiftable between two or more extreme positions as shown. The opening 14 is sufficiently large to permit movement of the lever to the various control positions.

The seal assembly comprises a plurality of flat overlapping plates 22 through 32 slideably mounted in a stacked manner to overlap and bridge or cover the opening 14 between the housing or wall 16 and the control lever 12. The illustrated plates are generally rectangular in configuration and as illustrated are progressively smaller as stacked from the wall 16 to the lever 12. Each of the substantially rectangular plates includes a substantially rectangular words, opening through which the lever 12 extends with the exception of the final plate 32 which has an opening of generally the configuration of the control element or lever 12. The difference in dimension between each of the openings or holes in the plate each designated by the plate number primed and the outside dimension of each of the plates are the same as illustrated. Thus, the openings of the plates of which there may be any number, are additive to provide an opening for the movement of the control lever to its various selected positions while at the same time the plate areas are additive to overlap progressively to cover the opening. In other words, each of the plates progressively overlaps and covers the hole in the plate on which it rests.

Suitable resilient biasing means such as a rubber or elastomeric boot or spring 34 operatively mounted on lever 12 in any suitable manner such as by means of a pair of rings 36 and 38 resiliently bias the plates together to prevent bouncing of the plates and at the same time seal the last remaining space 32' between plate 32 and lever 12.

The plates themselves may be preferably coated with a suitable anti-friction coating of any well-known type for the purpose of reducing frictional engagement between the plates and thereby reduce wear and force necessary to move or shift the lever. However, in spite of anti-friction coating and in the absence thereof, the friction between the plates may be advantageously used so as to serve the function of a detent mechanism. As can readily be seen, for example, sufficient friction may exist between the plates, especially upon proper adjustment of the bias therebetween, such that the friction between said plates will function to hold the lever in a selected position until the friction thereon is overcome by force applied to the lever. This bias can also reduce any tendency of the plates to vibrate.

The anti-friction coating for the plates may be a suitable material such as a synthetic resin polymer such as that sold under the trademark of TEFLON.

Suitable stop means 40 and 42 may be installed around the plates to guide and maintain the plates in proper orientation during movement of the lever through its control positions.

Referring now to FIG. 3, there is illustrated a modification of the means for biasing the plates together, which means comprises an elastomeric or rubber seal 44 urged or biased by means of a spring 46 against the plates. The spring 46 may be held in position by any suitable means such as a snap ring 48 engaging groove 50 on the lever 52. The remainder of the seal assembly, namely the plates and guide means, are identical to the previous embodiment and thus are identified by the same reference numerals.

An alternate embodiment of the invention is illustrated in FIG. 4. In this embodiment, a control lever 54 is pivotally mounted for movement about the axis of a shaft 56. The lever 54 extends through an opening 58 in a wall 60 and is provided with a console housing 61 from which the upper end extends for manipulation.

The seal means in this embodiment comprises a plurality of curved plates 62, 64, 66, 68 and 70, stacked in a manner as previously described. The plates are constructed to have a common radius substantially coincident with the pivot point of the control lever. If the lever is mounted to pivot in only one plane, the plates need be curved in only one plane. However, if the lever is mounted to move in several planes about a single plane, the plates would preferably be spherical segments. An advantage of this construction is that the plates do not move along the axis of the lever as it pivots. Thus, an elastomeric washer 72 held in place by a snap ring 74 may be used to apply bias to the plates to reduce any tendency to vibrate.

From the above description it is seen that we have provided a seal assembly for sealing an opening around a control lever or element which comprises a plurality of plate-like members slidably stacked in an overlapped manner to cover the opening between the control element and the housing and permit free movement of the control element throughout its selected range.

While our invention has been described with respect to a specific embodiment, it is to be understood that many modifications and changes in structure and application of the present invention may be made without departing from the spirit and scope of the present invention as defined in the appended claims. For example, the plates are not limited to a specific number or a specific configuration but may vary from two to any suitable number to serve its purpose and may take on any configuration to suit the shift pattern.

What is claimed is:

1. A seal for sealing around an opening in a wall having a pivotally movable control lever extending therethrough and having a pivot point spaced from said wall comprising in combination:
    a plurality of at least three curved plates,
    said plates being progressively smaller from engagement with said wall to engagement with said lever,
    the largest of said plates having an enlarged opening through which said control level extends and the smallest of said plates having a small hole just large enough for said control level to extend therethrough, and an intermediate plate covering said enlarged opening,
    said plates being curved to have a radius point substantially coincident with the pivot point of said lever, and slidably mounted in a stacked manner to overlap and bridge said opening between said wall and said control lever.

2. The invention of claim 1 wherein said larger of said plates is confined to slidable movement between stops on said wall,
    said opening and said slidable movement being adequate to permit said control lever to move through its necessary control positions, and
    the other of said plates being dimensioned and positioned to cover said opening in said largest of said plates and to permit said control lever movement.

3. The invention of claim 1 wherein said plates are coated with a friction reducing material.

4. The invention of claim 1 comprising resilient means operatively connected to said control lever and biased into engagement with said plates.

5. A seal for sealing an opening around a movable control lever extending through an enlarged opening in a wall wherein said control lever is mounted for pivotal movement with respect to said wall, about a plurality of axes spaced from said wall, said seal comprising:
    at least three curved overlapping plates, said plates curved to have a radius point coinciding with the pivot point of said control lever;
    said plates being slidably mounted around said control lever in a manner to overlap and progressively bridge said enlarged opening between said wall and said control lever.

6. The invention of claim 5 comprising:
    means for resiliently biasing said plates toward said wall, said means comprising an elastomeric washer held in place against said plates by a snap ring engaging a groove in said lever.

7. The invention of claim 5 wherein said plates comprises progressively smaller plates having similarly dimensioned openings stacked such that the largest of said plates engage said wall and the smallest of said plates operatively engage said lever; and,
    each of said plates overlap and partially cover the outer portion of the opening of the adjacent larger plate.

* * * * *